(12) United States Patent
Kong et al.

(10) Patent No.: US 10,819,639 B2
(45) Date of Patent: Oct. 27, 2020

(54) METHOD FOR MANAGING SHARED TERMINAL AND DEVICE THEREFOR

(71) Applicant: SOOSAN INT CO., LTD., Seoul (KR)

(72) Inventors: Kyoung Pil Kong, Seoul (KR); Sun Min Jeon, Seoul (KR); Jun Young Song, Seoul (KR); Min Woo Nam, Seoul (KR); Kyoung Tae Kang, Seoul (KR)

(73) Assignee: SOOSAN INT CO., LTD., Seoul (KR)

( * ) Notice: Subject to any disclaimer, the term of this patent is extended or adjusted under 35 U.S.C. 154(b) by 259 days.

(21) Appl. No.: 15/773,879

(22) PCT Filed: Nov. 5, 2015

(86) PCT No.: PCT/KR2015/011834
§ 371 (c)(1),
(2) Date: May 4, 2018

(87) PCT Pub. No.: WO2017/078196
PCT Pub. Date: May 11, 2017

(65) Prior Publication Data
US 2018/0375774 A1    Dec. 27, 2018

(51) Int. Cl.
*H04L 12/801* (2013.01)
*H04L 12/823* (2013.01)
(Continued)

(52) U.S. Cl.
CPC ............. *H04L 47/12* (2013.01); *H04L 29/08* (2013.01); *H04L 47/32* (2013.01); *H04L 67/02* (2013.01); *H04L 67/303* (2013.01); *G06F 3/0482* (2013.01)

(58) Field of Classification Search
CPC ....... H04L 47/12; H04L 67/303; H04L 29/08; H04L 67/02; H04L 47/32; G06F 3/0482
See application file for complete search history.

(56) References Cited

U.S. PATENT DOCUMENTS

2005/0135264 A1    6/2005    Popoff et al.
2007/0156900 A1    7/2007    Chien
(Continued)

FOREIGN PATENT DOCUMENTS

KR    1020020085301 A    11/2002
KR       101002421 B1    12/2010
(Continued)

OTHER PUBLICATIONS

International Search Report for PCT/KR2015/011834 dated Aug. 1, 2016, all pages.
(Continued)

*Primary Examiner* — Soe Hlaing
(74) *Attorney, Agent, or Firm* — Kilpatrick Townsend & Stockton LLP (57) ABSTRACT

Provided are a sharing terminal management method and a sharing terminal management apparatus. In response to an Internet access request packet, a sharing terminal management server collects terminal environment information and stores as many pieces of terminal environment information as the number of terminals permitted for each line in a permitted list via a process of transmitting a response packet for the Internet access request packet, and determines whether to transmit an Internet blocking notification, based on whether newly collected terminal environment information exists in the permitted list.

20 Claims, 11 Drawing Sheets

(51) Int. Cl.
*H04L 29/08* (2006.01)
*G06F 3/0482* (2013.01)

(56) References Cited

U.S. PATENT DOCUMENTS

| | | | |
|---|---|---|---|
| 2010/0274799 A1* | 10/2010 | Lee | H04L 41/12 |
| | | | 707/769 |
| 2011/0185060 A1* | 7/2011 | Park | H04L 63/0227 |
| | | | 709/224 |
| 2012/0023593 A1 | 1/2012 | Puder et al. | |
| 2013/0254394 A1* | 9/2013 | Kong | H04L 63/0281 |
| | | | 709/224 |

FOREIGN PATENT DOCUMENTS

| | | |
|---|---|---|
| KR | 101518474 B1 | 5/2015 |
| KR | 1020150061350 A | 6/2015 |
| WO | 2017/0178196 A1 | 5/2017 |

OTHER PUBLICATIONS

Written Opinion for PCT/KR2015/011834 dated May 11, 2017, all pages. No English translation available.

\* cited by examiner

| ID | PUBLIC IP | OS | SCREEN SIZE | Fonts | HASH CODE |
|---|---|---|---|---|---|
| AAA | 1.1.1.1 | WIN 64bit | 1024×768 | 0×EEEEE | 1234 |
| AAA | 1.1.1.1 | WIN 64bit | 800×600 | 0×CEEEE | 3456 |
| | | | | | |
| | | | | | |

METHOD FOR MANAGING SHARED TERMINAL AND DEVICE THEREFOR

TECHNICAL FIELD

The present disclosure relates to a method and apparatus for managing Internet address-sharing terminals, and more particularly, to a method and apparatus for managing a plurality of terminals that share an Internet address by transmitting an Internet blocking notification to the terminals.

BACKGROUND ART

In order to detect a plurality of terminals that share an Internet address by using a conventional sharer or the like, there exists a method of detecting a terminal by installing a particular program in the terminal or inserting a terminal identifier (ID) into a cookie or flash-shared object of the terminal.

However, when a particular program is installed in the terminal, a user of the terminal may refuse installation of a program for sharer detection or delete an installed program, and the user may also delete a cookie. In this case, it is difficult to accurately detect sharing terminals.

Moreover, due to an explosive increase in the number of Internet users, server load may increase when Internet connection blocking is determined by analyzing all Internet access traffic and determining whether the Internet access traffic has exceeded the number of terminals permitted for each line.

DESCRIPTION OF EMBODIMENTS

Technical Problem

Provided are an Internet address-sharing terminal managing method capable of easily identifying and managing an Internet address-sharing terminal to which a blocking notification is to be transmitted, without needing to install a special program in a user terminal or inserting a terminal identifier (ID) into a cookie or the like, and an Internet address-sharing terminal managing apparatus that performs the Internet address-sharing terminal managing method.

Solution to Problem

According to an aspect of the present disclosure, a sharing terminal management method in a sharing terminal management server includes: receiving an Internet access request packet; transmitting a response packet for the Internet access request packet; collecting terminal environment information from a terminal that has transmitted the Internet access request packet by using the response packet; collecting as many different pieces of terminal environment information as the number of terminals permitted for each line and storing the collected pieces of terminal environment information in a permitted list; and determining whether to transmit an Internet blocking notification, based on whether newly collected terminal environment information exists in the permitted list.

According to another aspect of the present disclosure, a sharing terminal management method in a user terminal includes: transmitting an Internet access request packet; when a response packet for the Internet access request packet is received from a sharing terminal management server rather than from a server that the Internet access request packet originally sought to access, ascertaining terminal environment information and transmitting the terminal environment information to the sharing terminal management server; and receiving an Internet blocking notification from the sharing terminal management server and displaying the Internet blocking notification on a screen of the user terminal.

Advantageous Effects of Disclosure

According to the present disclosure, an Internet address-sharing terminal to which a blocking notification is to be transmitted may be easily identified based on environment information of a user terminal. In addition, server load may be reduced by transmitting a blocking notification to only a user of a preset sharing terminal instead of all users. Moreover, the possibility of incorrect Internet blocking due to misjudgment may be reduced by managing information about permitted terminals, namely, a white list, based on the frequency of terminal environment information during a certain time period.

MODE OF DISCLOSURE

A sharing terminal managing method and a sharing terminal managing apparatus according to the present disclosure will now be described in detail with reference to the accompanying drawings.

Figure 1:
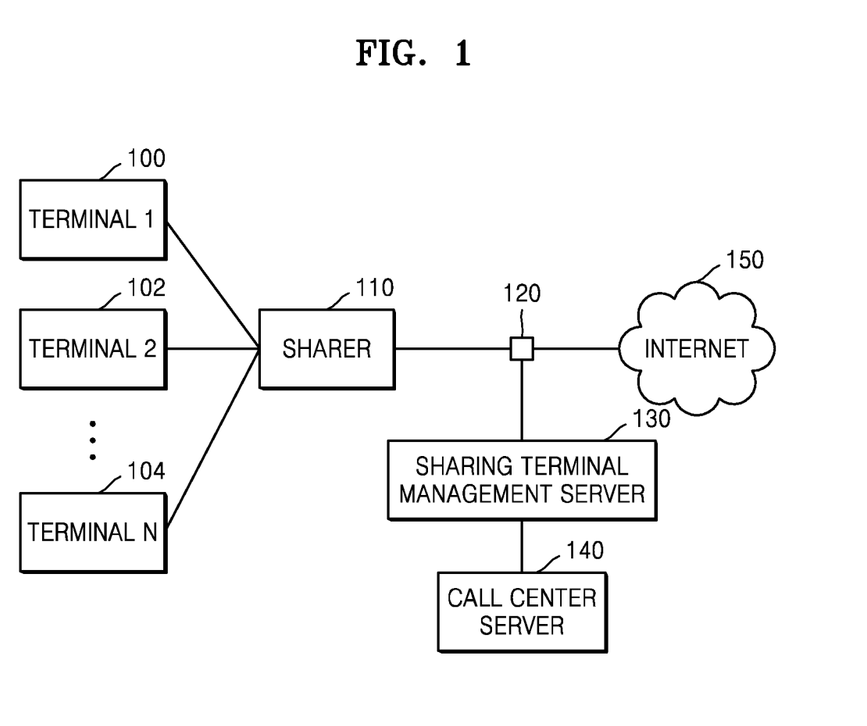
FIG. 1 is a diagram schematically illustrating a structure of a system for managing sharing terminals, according to the present disclosure.

FIG. 1 is a diagram schematically illustrating a structure of a system for managing sharing terminals, according to the present disclosure.

Referring to FIG. 1, a plurality of user terminals 100, 102, and 104 share an Internet address via a sharer 110. Terminals that share an Internet address will now be referred to as sharing terminals. A source address of a packet that is transmitted from the sharing terminals 100, 102, and 104 to the Internet 150 is changed to a public Internet address by the sharer 110 and transmitted to the Internet 150, and a destination address of a packet that is transmitted from the Internet 150 to the sharing terminals 100, 102, and 104 is changed to an internal private Internet address by the sharer 110 and transmitted to the sharing terminals 100, 102, and 104. Because only the public Internet address may be known outside the sharer 110, it is generally difficult to identify sharing terminals that share an Internet address via the sharer 110.

When a sharing terminal management server 130 receives Internet access traffic via a mirroring apparatus 120, such as a tap, the sharing terminal management server 130 ascertains terminal environment information by generating a response packet corresponding to the Internet access traffic and transmitting the response packet to the sharing terminals 100, 102, and 104, and determines whether to transmit a blocking notification, based on the ascertained terminal environment information. Although the present embodiment illustrates that the sharing terminal management server 130 is connected via the mirroring apparatus 120, embodiments are not limited thereto, and the sharing terminal management server 130 may be implemented at a place where the mirroring apparatus 120 is located or may be implemented on the Internet 150. In this way, various design changes may be made.

The sharing terminal management server 130 may primarily detect whether a terminal seeking to access the Internet is a sharing terminal, by inserting a terminal identifier (ID) into a terminal by using a cookie or a flash-shared object, installing a special sharing detection program in the terminal in a terminal, or analyzing a pattern of various pieces of information included in Internet access traffic. However, a user may easily delete a cookie or a flash-shared object, and, when installation of a special sharing detection program is sought in a terminal, the user may refuse installation of the special sharing detection program or may delete an installed sharing detection program. Thus, there is a limit in detecting a sharing terminal.

As another example, as a method capable of excluding interference by a user as much as possible, the sharing terminal management server 130 may detect a user-agent included in Internet access traffic, and may detect whether a terminal seeking to access the Internet is a sharing terminal, based on the number of different user-agents detected for the same public Internet address. However, because the values of the user-agents are different from each other according to the type or version of a browser and a site to which a sharing terminal seeks to connect, it is difficult to accurately detect a sharing terminal.

For example, when a terminal seeks to access a portal site A, a user-agent included in Internet access traffic is "Mozilla/5.0 (Windows NT 6.1; WOW64; Trident/7.0; rv:11.0) like Gecko", whereas a user-agent included in Internet access traffic when a terminal seeks to access a portal site B is "Mozilla/5.0 (compatible; MSIE 10.0; Windows NT 6.1; WOW64; Trident/7.0)". Thus, a form and information of a user-agent may differ in each access to a portal site.

Accordingly, the sharing terminal management server 130 determines whether to transmit a blocking notification by using terminal environment information described below with reference to FIG. 2, instead of immediately transmitting an Internet blocking notification to a detected sharing terminal using a coolie or flash-shared object, a special sharing detection program, or a user-agent.

When a call center server 140 receives consultation reservation information from the sharing terminal management server 130, the call center server 140 provides the received consultation reservation information to a call center employee. Through a telephone call, the call center employee performs a consultation according to the counseling reservation information.

Figure 2:
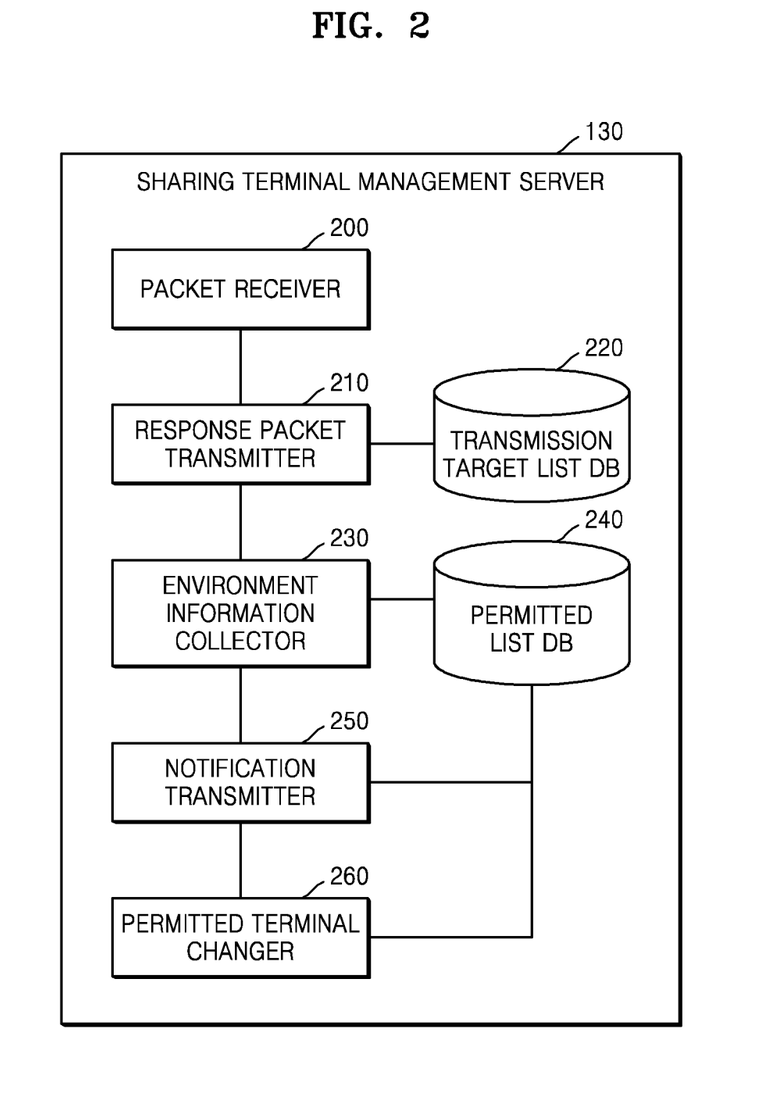
FIG. 2 is a block diagram of a structure of a sharing terminal management server, according to an embodiment of the present disclosure.

FIG. 2 is a block diagram of a structure of a sharing terminal management server, according to an embodiment of the present disclosure.

Referring to FIG. 2, the sharing terminal management server 130 includes a packet receiver 200, a response packet transmitter 210, a transmission target list database (DB) 220, an environment information collector 230, a permitted list DB 240, a notification transmitter 240, and a permitted terminal changer 250.

Figure 8:
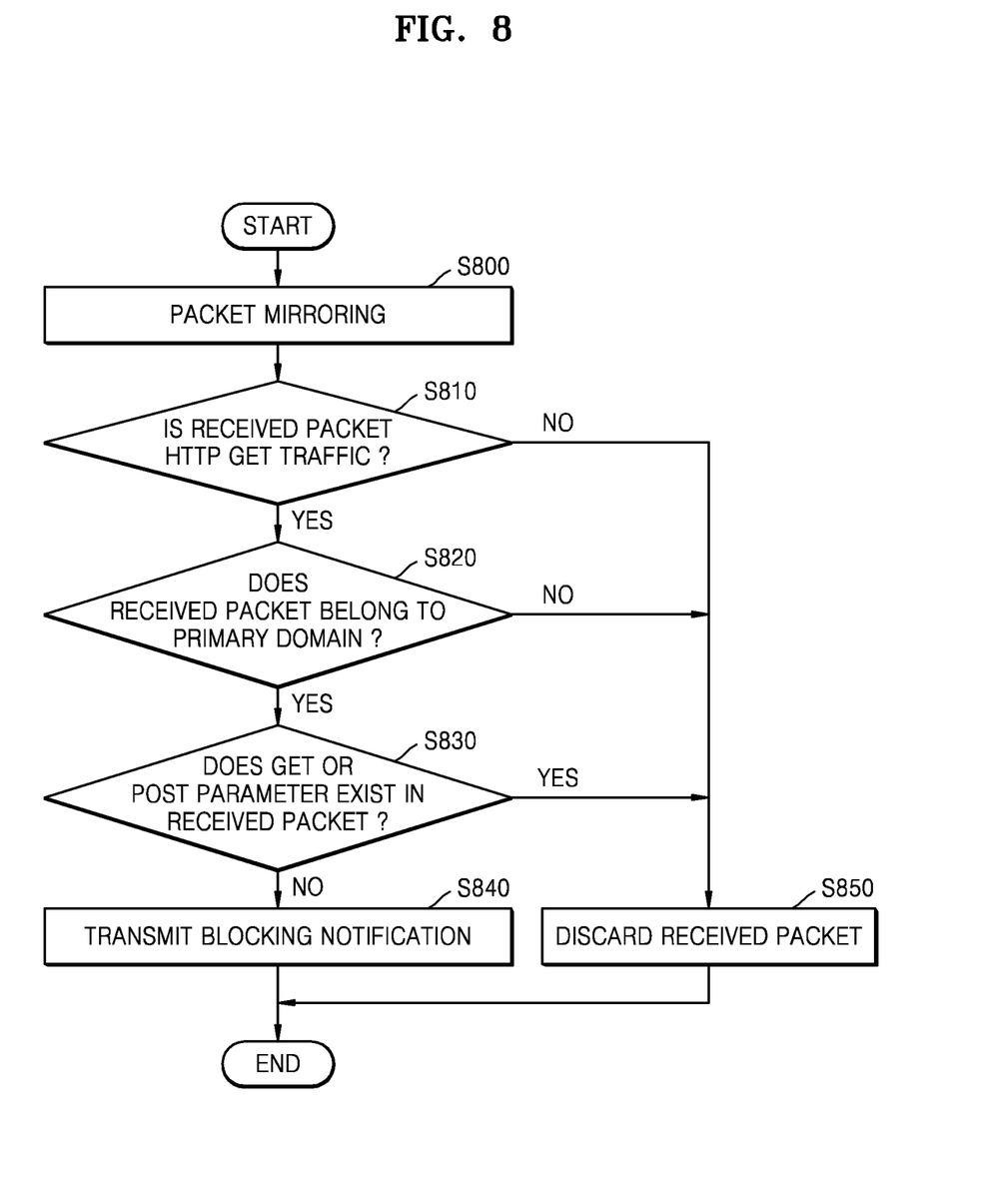
FIG. 8 is a flowchart of a primary selection process of a packet for transmitting a blocking notification, according to the present disclosure.

The packet receiver 200 receives a packet from a sharing terminal. Because many packets are transmitted from a sharing terminal to the Internet, when determination as to whether to transmit a blocking notification is made with respect to each packet, a load on a server may increase. Thus, only when a received packet is an Internet access request packet, the packet receiver 200 transmits the received packet. Otherwise, the packet receiver 200 discards the received packet. A detailed process of primarily determining whether the received packet is a target to undergo a process of transmitting a blocking notification is shown in FIG. 8.

The response packet transmitter 210 generates a response packet for the Internet access request packet received from the packet receiver 200, and transmits the response packet to the sharing terminal. The response packet includes an instruction for collecting terminal environment information. For example, the response packet may include a command of collecting the terminal environment information, in a web browser plug-in form, such as a Java script or a flash.

The response packet transmitter 210 may not transmit response packets for all Internet access request packets and may secondarily select a target to transmit a response packet by using the transmission target list DB 220. For example, the response packet transmitter 210 generates a response packet and transmits the response packet to the sharing terminal, only when a public Internet address ascertained from the Internet access request packet or a user ID corresponding to the ascertained public Internet address exists in the transmission target list DB 220.

As another example, when a response packet transmission section and a response packet non-transmission section for each subscriber are predefined, the response packet transmitter 210 transmits a response packet only in the response packet transmission section and transmits a blocking notification, thereby reducing a server load. For example, as for enterprise subscribers, working hours from 9:00 to 18:00 may be defined as a response packet transmission section and the remaining hours may be defined as a response packet non-transmission section, and, as for individual subscribers, hours from 18:00 to 24:00 may be defined as a response packet transmission section and the remaining hours may be defined as a response packet non-transmission section.

The transmission target list DB 220 stores a transmission target list indicating a target to which a response packet is to be transmitted. The transmission target list is a type of sharing terminal suspect list selected using various sharing terminal detecting methods, such as a method of inserting a user ID into a terminal by using a cookie or flash-shared object and a method of installing a specific program for sharing detection in a terminal. The transmission target list DB 220 may be updated at intervals of a certain time period (for example, one day).

Figure 3:
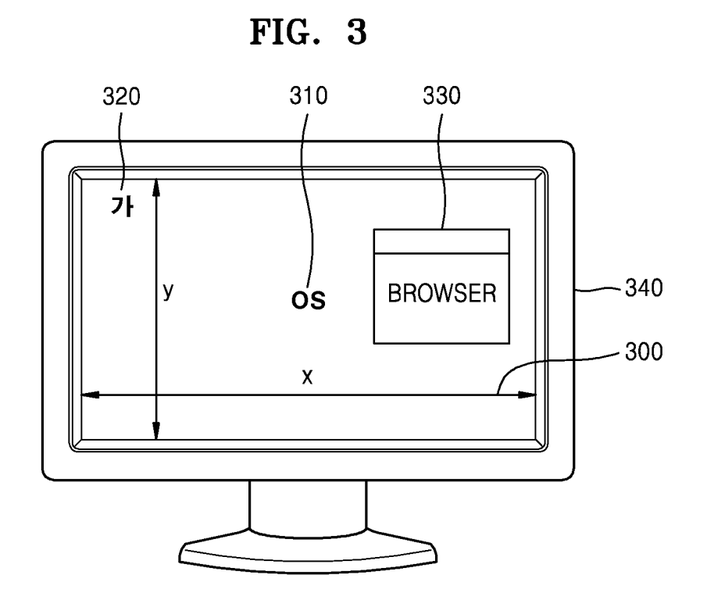
FIG. 3 is a diagram illustrating an example of terminal environment information, according to the present disclosure.

The environment information collector 230 collects the terminal environment information of the sharing terminal by using the response packet. The terminal environment information indicates various pieces of information related to hardware or software of a terminal. Examples of the terminal environment information include a screen size, a plug-in value installed in a browser, system font information, as shown in FIG. 3.

Figure 4:
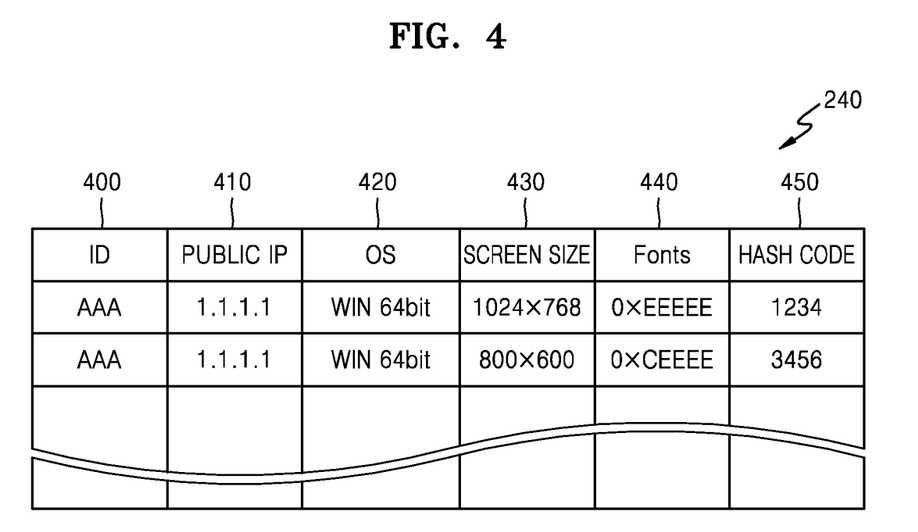
FIG. 4 is a table showing an example of a permitted list stored in a permitted list database (DB), according to the present disclosure.

The permitted list DB 240 stores the terminal environment information of the sharing terminal collected by the environment information collector 230. An example of a permitted list stored in the permitted list DB 240 is shown in FIG. 4. The permitted list includes a certain number of pieces of terminal environment information. For example, when the number of terminals permitted for a line of a user AAA is 2, the environment information collector 240 stores only two different pieces of terminal environment information in the permitted list.

Different pieces of terminal environment information stored in the permitted list may be selected according to several methods. For example, a certain number of different pieces of terminal environment information selected in an ascending or descending order, based on the frequency number of various pieces of terminal environment information collected by the environment information collector 230 for a certain period of time, may be stored in the permitted list. In addition, terminal environment information may be selected according to several statistical techniques and as many pieces of terminal environment information as the number of permitted terminals for each line may be stored in the permitted list.

The notification transmitter 250 transmits an Internet blocking notification to the sharing terminal, based on whether the terminal environment information exists in the permitted list. In detail, when the terminal environment information received from the sharing terminal exists in the permitted list or when no terminal environment information exists in the permitted list but the number of different pieces of terminal environment information stored in the permitted list is less than the number of terminals permitted for a corresponding line, the notification transmitter 250 permits Internet access by the sharing terminal. On the other hand, when no terminal environment information exists in the permitted list and the number of pieces of terminal environment information stored in the permitted list is equal to or greater than the number of permitted terminals, the notification transmitter 250 transmits the Internet blocking notification to the sharing terminal and blocks Internet access.

When the permitted terminal changer 260 receives a permitted terminal change request from the sharing terminal, the permitted terminal changer 260 replaces one of the pieces of terminal environment information included in the permitted list with new terminal environment information of the sharing terminal that transmitted the permitted terminal change request. What terminal environment information from the permitted list is to be replaced follows a preset policy. For example, the permitted terminal changer 260 may replace oldest terminal environment information in the permitted list with new terminal environment information.

FIG. 3 is a diagram illustrating an example of terminal environment information according to the present disclosure.

Referring to FIG. 3, the terminal environment information includes values of various plug-ins installed in an Internet access browser 330 of a user terminal 340, operating system (OS) information (type or version information) 310, a user-agent (browser version or type, etc.), a screen size (for example, screen resolution information of an x axis and a y axis) 300, and a system font 320 installed according to the type or version of a program, such as "MS-Office".

The terminal environment information is not limited to the example of FIG. 3, and may include various pieces of information capable of representing the environment of hardware or software of a terminal.

In some cases, the sharing terminal management server may collect only the screen size as the terminal environment information or collect both the screen size and font information as the terminal environment information. In this way, the number or order of collected pieces of terminal environment information may be changed variously.

FIG. 4 is a table showing an example of a permitted list stored in a permitted list DB according to the present disclosure.

Referring to FIG. 4, the permitted list of the permitted list DB 240 includes a user ID field 400, a public Internet address field 410, one or more terminal environment information fields 420, 430, and 440, and a hash code field 450.

The user ID field 400 includes information identifying different subscribers for different lines, and the public Internet address field 410 includes an Internet address allocated to each subscriber line. For example, when a public Internet address 1.1.1.1 is allocated to a subscriber who subscribed to one Internet line, AAA as information identifying the subscriber is stored in the user ID field 400, and the Internet address 1.1.1.1 is stored in the Internet address field 410.

In detail, the terminal environment information fields 420, 430, and 440 include an OS information field 420, a screen size information field 430, and a font information field 440. The sharing terminal management server performs a comparison between pieces of terminal environment information in order to determine whether received terminal environment information exists in the permitted list. For example, in the case of FIG. 4, the sharing terminal management server compares terminal environment information including "OS information+screen size information+font information" with each other. However, when many pieces of information are included in the terminal environment information or a large size of information is included in the terminal environment information, much time is taken to compare them. To this end, the sharing terminal management server may store a hash code for the terminal environment information in the hash code field 450, and then ascertain whether the received terminal environment information exists in the permitted list, via a combination between relatively small hash codes rather than a comparison between the terminal environment information itself. The hash code field 450 may be omitted in some cases.

Figure 5:
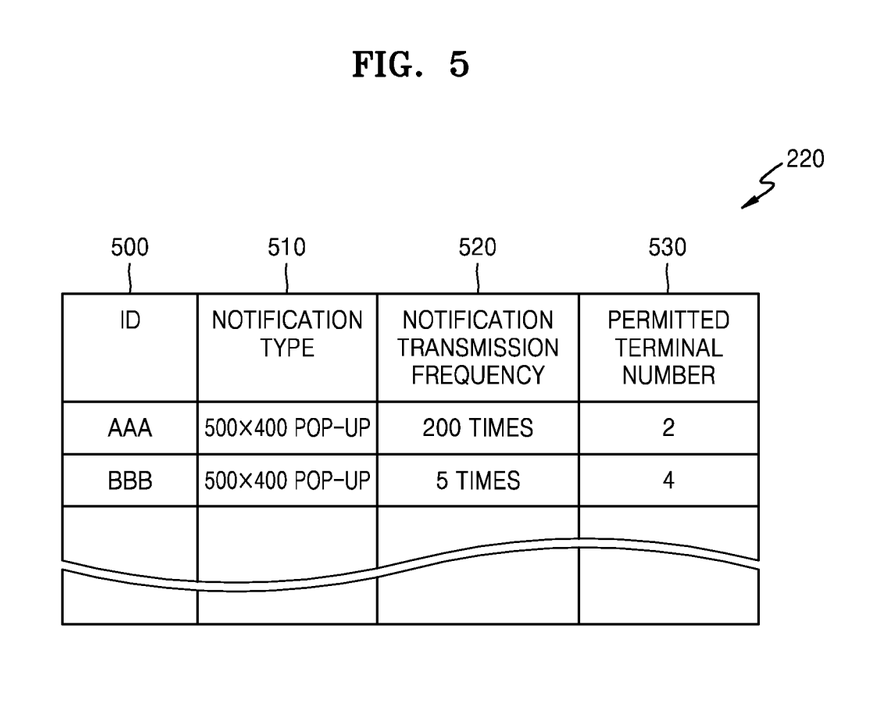
FIG. 5 is a table showing an example of a transmission target list DB, according to the present disclosure.

FIG. 5 is a table showing an example of a transmission target list DB according to the present disclosure.

Referring to FIG. 5, the transmission target list DB 220 includes a user ID field 500, a notification type field 510, a notification transmission frequency field 520, and a permitted terminal number field 530.

The user ID field 500 includes information identifying a subscriber for each Internet line.

The notification type field 510 indicates a method used to express an Internet blocking notification in consideration of terminal environment of a user. For example, as for a user AAA and a user BBB, the Internet blocking notification is expressed via a 500×400 pop-up window.

The notification transmission frequency field 520 indicates the number of times a blocking notification has been transmitted for each user (i.e., each Internet line). For example, in the case of FIG. 5, 200 blocking notifications have been transmitted for the user AAA, and 5 blocking notifications have been transmitted for the user BBB. The notification transmission frequency field 520 may include the number of times a notification was transmitted during a time section from a current time point to a certain past time point.

The permitted terminal number field 530 indicates the number of terminals permitted for each user (or each line). For example, sharing of two terminals is permitted for the user AAA, and sharing of four terminals is permitted for the user BBB.

Figure 6:
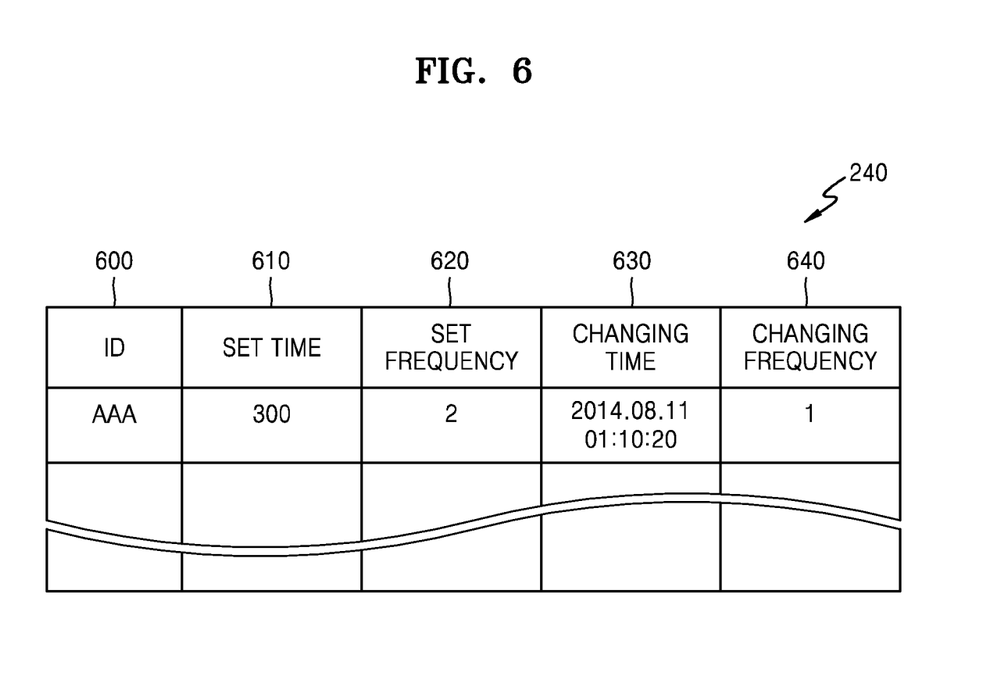
FIG. 6 is a table showing an example of a permitted terminal change management list, according to the present disclosure.

FIG. 6 is a table showing an example of a permitted terminal change management list according to the present disclosure.

Referring to FIG. 6, the permitted terminal change management list includes a user ID field 600, a set time field 610, a set frequency field 620, a changing time field 630, and a changing frequency field 640. The permitted terminal change management list may be built as a special DB, or may be stored and managed in the permitted list DB 240.

The user ID field 600 includes information identifying a subscriber for each Internet line.

The set time field 610 indicates a time interval at which a user may change a permitted terminal in response to an Internet blocking notification. For example, when a set time is 300 seconds, a permitted terminal change among sharing terminals that share the same public Internet address may be conducted once within 300 seconds.

The set frequency field 620 indicates the number of times a permitted terminal may be changed during a certain period of time. For example, when the number of times a permitted terminal may be changed during one day is set to be 2, even when a set time defined in the set time field 610 has lapsed, changing of a permitted terminal is refused if a permitted terminal change request is made more than two times for one day.

The changing time field 630 and the changing frequency field 640 respectively indicate the time point when a permitted terminal was changed according to a permitted terminal change request of the sharing terminal, and the number of times a permitted terminal was changed according to the permitted terminal change request of the sharing terminal.

Figure 7:
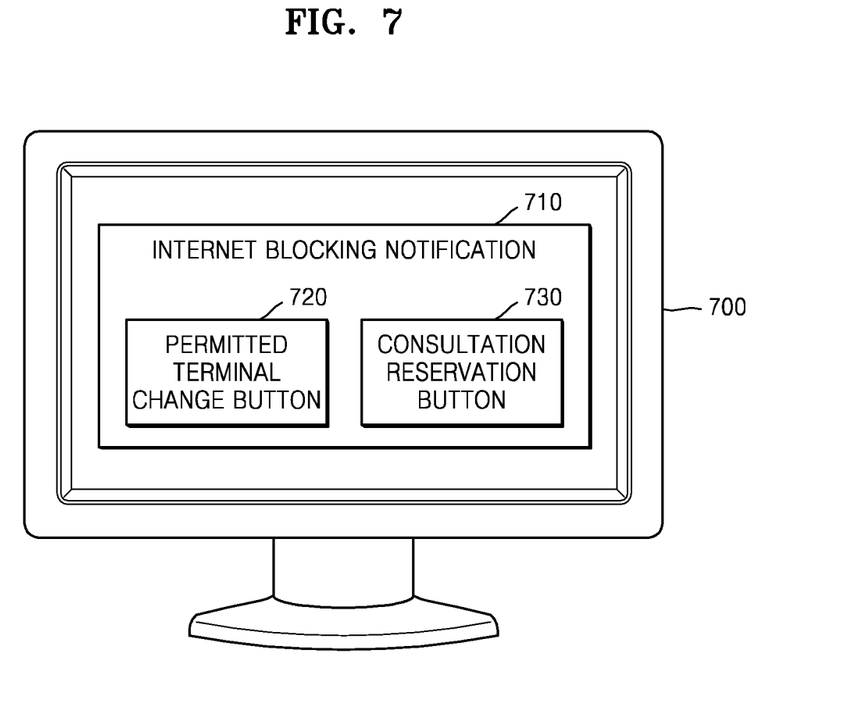
FIG. 7 is a diagram illustrating an example of a screen of a sharing terminal on which an Internet blocking notification is displayed, according to the present disclosure.

FIG. 7 is a diagram illustrating an example of a screen of a sharing terminal on which an Internet blocking notification is displayed, according to the present disclosure.

Referring to FIG. 7, a sharing terminal 700 displays, on its screen, an Internet blocking notification 710 received from a sharing terminal management server. The Internet blocking notification 710 may include a permitted terminal change button 720 and a consultation reservation button 730.

When a user selects the permitted terminal change button 720, the sharing terminal 700 transmits a permitted terminal change request to the sharing terminal management server. When the sharing terminal management server accepts the permitted terminal change request, Internet blocking of the sharing terminal 700 is cancelled.

When the user selects the consultation reservation button 730, the sharing terminal 700 transmits a consultation reservation request to the sharing terminal management server. According to an embodiment, when a consultation reservation button is selected, Internet access by a sharing terminal may be allowed during a predetermined time period.

FIG. 8 is a flowchart of a process of primarily selecting a packet for transmitting a blocking notification, according to the present disclosure.

Referring to FIG. 8, the sharing terminal management server does not perform a blocking notification transmitting process with respect to all received packets but primarily selects a received packet satisfying a certain condition from among received packets and performs a blocking notification transmission process with respect to only the selected received packet.

In detail, when the sharing terminal management server receives a packet via a packet mirroring apparatus in operation S800, the sharing terminal management server determines whether the received packet is an Internet access request packet, in operation S810. For example, the sharing terminal management server ascertains whether the received packet is HTTP GET traffic, in operation S810.

When the received packet is an Internet access request packet, the sharing terminal management server determines whether the received packet is an access request with respect to a primary domain, in operation S820. The primary domain is a general top-level domain, and the range of the primary domain is preset to a major portal site or a certain range of major sites.

In operation S830, when the received packet belongs to the primary domain, the sharing terminal management server determines whether a GET or POST parameter exists in the received packet. When no GET or POST parameters exist in the received packet, the sharing terminal management server proceeds to a next operation for transmitting a blocking notification, in operation S840.

When the received packet is not an Internet access request packet, when the received packet does not belong to the primary domain, or when the received packet includes a GET or POST parameter, the sharing terminal management server discards the received packet, in operation S850.

Figure 9:
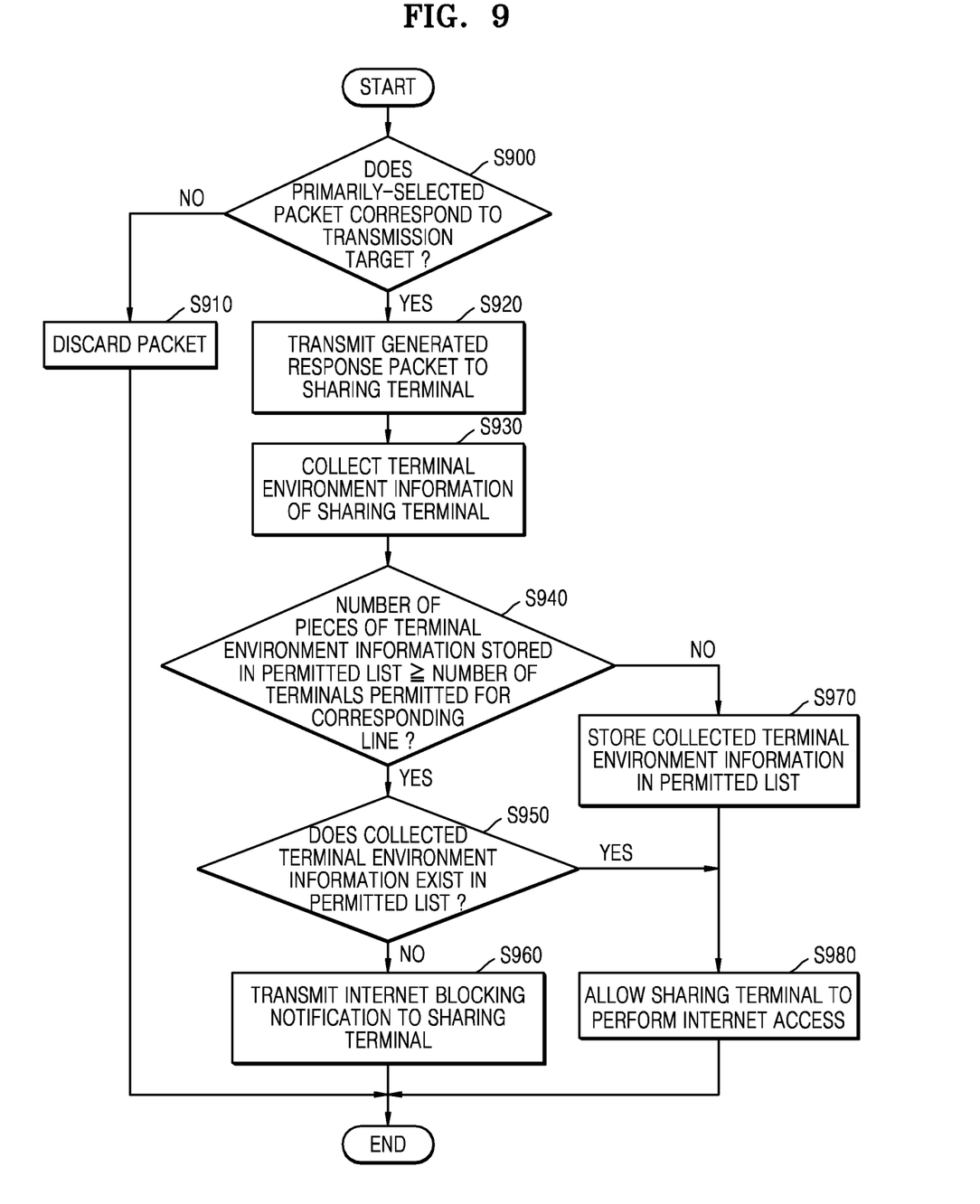
FIG. 9 is a flowchart of an example of a blocking notification transmission method, according to the present disclosure.

FIG. 9 is a flowchart of an example of a blocking notification transmitting method according to the present disclosure.

Referring to FIG. 9, the sharing terminal management server performs a secondary selection to determine whether a packet primarily selected through the process of FIG. 8 corresponds to a transmission target, in operation S900. For example, the sharing terminal management server determines whether a user of a sharing terminal that has transmitted an Internet access request packet exists in a transmission target list DB, in operation S900. When the user of the sharing terminal does not correspond to a transmission target, the packet is discarded and no more processes are performed, in operation S910.

On the other hand, when the user of the sharing terminal corresponds to a transmission target, the sharing terminal management server generates a response packet for collecting terminal environment information and transmits the generated response packet to the sharing terminal, in operation S920, and collects terminal environment information of the sharing terminal, in operation S930.

When the number of pieces of terminal environment information stored in the permitted list is equal to or greater than the number of terminals permitted for a corresponding line in operation S940, the sharing terminal management server ascertains whether the collected terminal environment information exists in the permitted list, in operation S950. When the collected terminal environment information does not exist in the permitted list, the sharing terminal management server transmits an Internet blocking notification to the sharing terminal and blocks Internet access by the sharing terminal, in operation S960.

On the other hand, when it is determined in operation S940 that the number of pieces of terminal environment information stored in the permitted list is less than the number of terminals permitted for the corresponding line, the sharing terminal management server stores the collected terminal environment information in the permitted list, in operation S970. In operation S980, the sharing terminal management server transmits, to the sharing terminal, a packet requesting to re-access a server to which the sharing terminal originally sought to connect, and allows Internet access by the sharing terminal. Also, when it is determined in operation S950 that the collected terminal environment information exists in the permitted list, the sharing terminal management server transmits, to the sharing terminal, a packet requesting to re-access a server to which the sharing terminal originally sought to connect, and allows Internet access by the sharing terminal, in operation S980.

Figure 10:
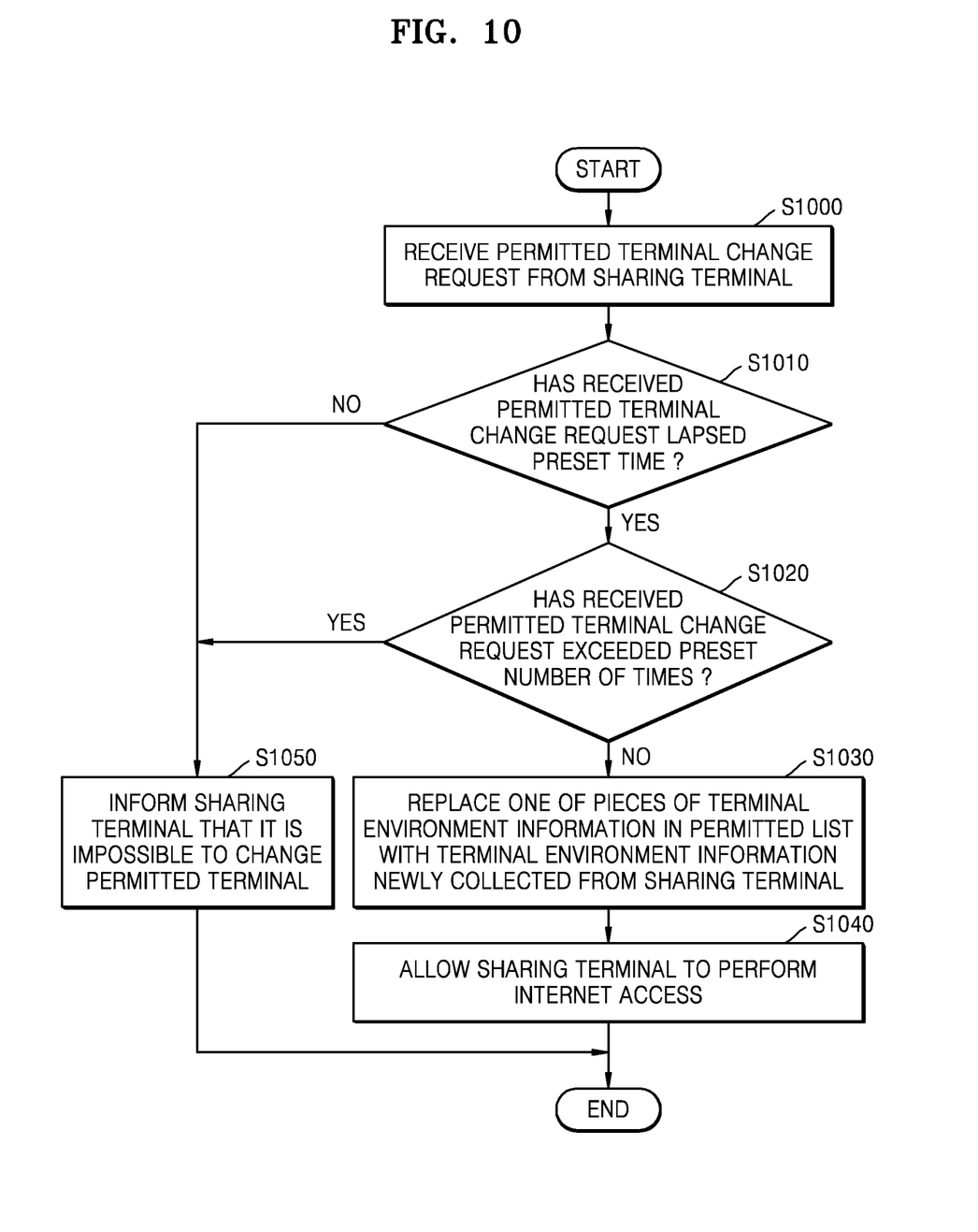
FIG. 10 is a flowchart of a permitted terminal changing method according to an embodiment of the present disclosure.

FIG. 10 is a flowchart of a permitted terminal changing method according to an embodiment of the present disclosure.

Referring to FIG. 10, in operation S1000, when a user clicks a permitted terminal changing button of an Internet blocking notification displayed on the screen of a sharing terminal, the sharing terminal transmits a permitted terminal change request to a sharing terminal management server.

When the received permitted terminal change request has not lapsed a preset time (for example, the set time 610 of FIG. 6) after a time point when a previous change request was received, in operation S1010, the sharing terminal management server does not change a permitted terminal and informs the sharing terminal that it is impossible to change the permitted terminal, in operation S1050.

Also, when the received permitted terminal change request has lapsed the preset time in operation S1010 but has exceeded the number of times (the set frequency 620 of FIG. 6) a permitted terminal may be changed during a certain period of time, in operation S1020, the sharing terminal management server does not change a permitted terminal and informs the sharing terminal that it is impossible to change the permitted terminal, in operation S1050.

When the received permitted terminal change request has lapsed the preset time in operation S1010 and has not exceeded the preset frequency in operation S1020, the sharing terminal management server replaces one of the pieces of terminal environment information in the permitted list with terminal environment information newly collected from the sharing terminal, in operation S1030, and allows Internet access by the sharing terminal, in operation S1040.

Figure 11:
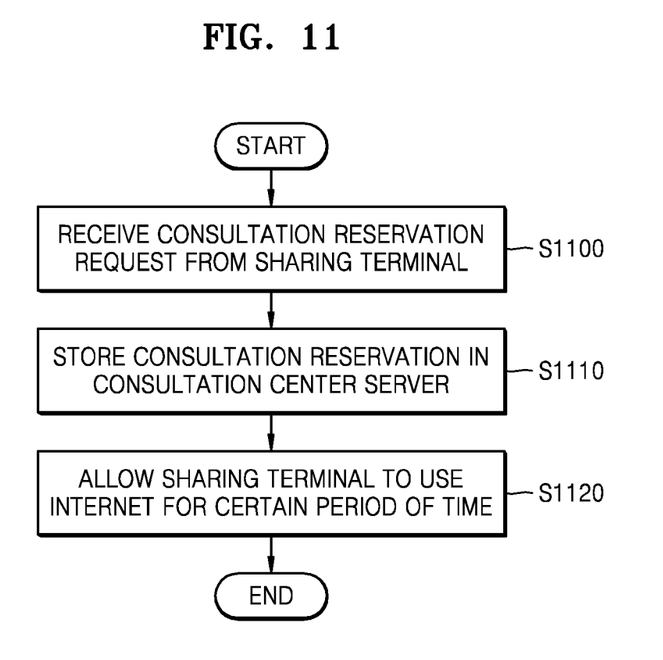
FIG. 11 is a flowchart of a consultation reservation method according to an embodiment of the present disclosure.

FIG. 11 is a flowchart of a consultation reserving method according to an embodiment of the present disclosure.

Referring to FIG. 11, in operation S1100, when a user clicks a consultation reservation button of an Internet blocking notification displayed on the screen of a sharing terminal, the sharing terminal transmits a consultation reservation request to a sharing terminal management server. In operation S1110, in response to the consultation reservation request, the sharing terminal management server stores a consultation reservation in a consultation center server. In operation S1120, the sharing terminal management server allows the sharing terminal to use the Internet for a certain period of time.

Figure 12:
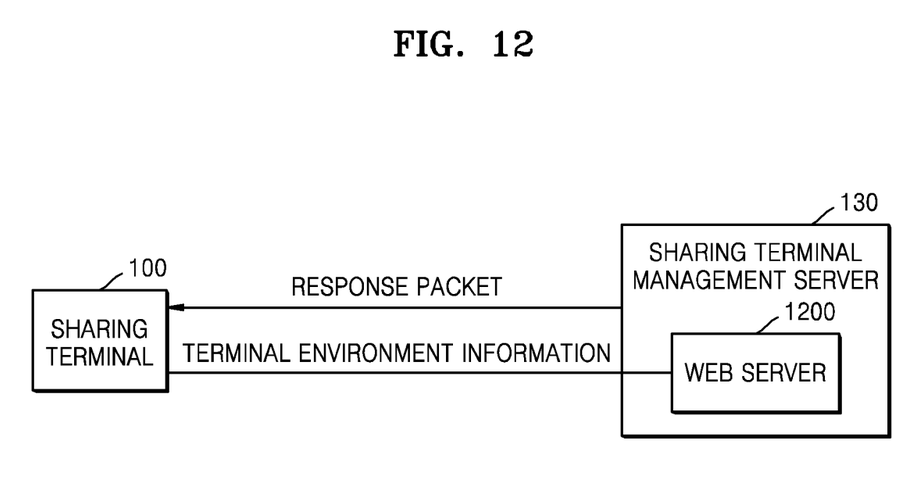
FIG. 12 is a block diagram illustrating an example of a method by which a sharing terminal management server receives terminal environment information, according to the present disclosure.

FIG. 12 is a block diagram illustrating an example of a method in which a sharing terminal management server receives terminal environment information, according to the present disclosure.

Referring to FIG. 12, the sharing terminal management server 130 includes a web server 1200. The web server 1200 transmits a response packet including a collection command of terminal environment information in a plug-in form to the sharing terminal 100. A browser that is currently being executed for Internet access in the sharing terminal 100 collects terminal environment information according to the plug-in of the response packet received from the web server 1200 and transmits the collected terminal environment information to the web server 1200.

Figure 13:
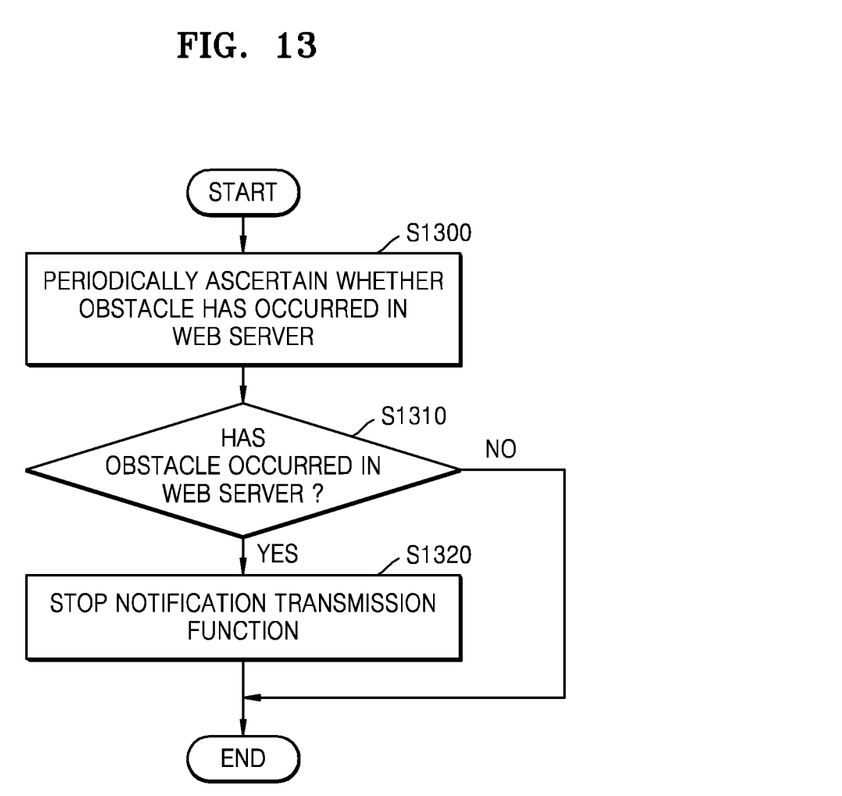
FIG. 13 is a flowchart of an example of a method by which a sharing terminal management server handles an obstacle, according to the present disclosure.

FIG. 13 is a flowchart of an example of a method in which a sharing terminal management server handles an obstacle, according to the present disclosure.

Referring to FIG. 13, in operation S1300, a sharing terminal management server including a web server as in FIG. 12 periodically ascertains whether an obstacle has occurred in the web server or the like. When an obstacle has occurred, the sharing terminal management server stops a notification transmission function, namely, a process of transmitting a response packet to collect terminal environment information and transmitting a blocking notification, until the obstacle is recovered, in operation S1320.

Figure 14:
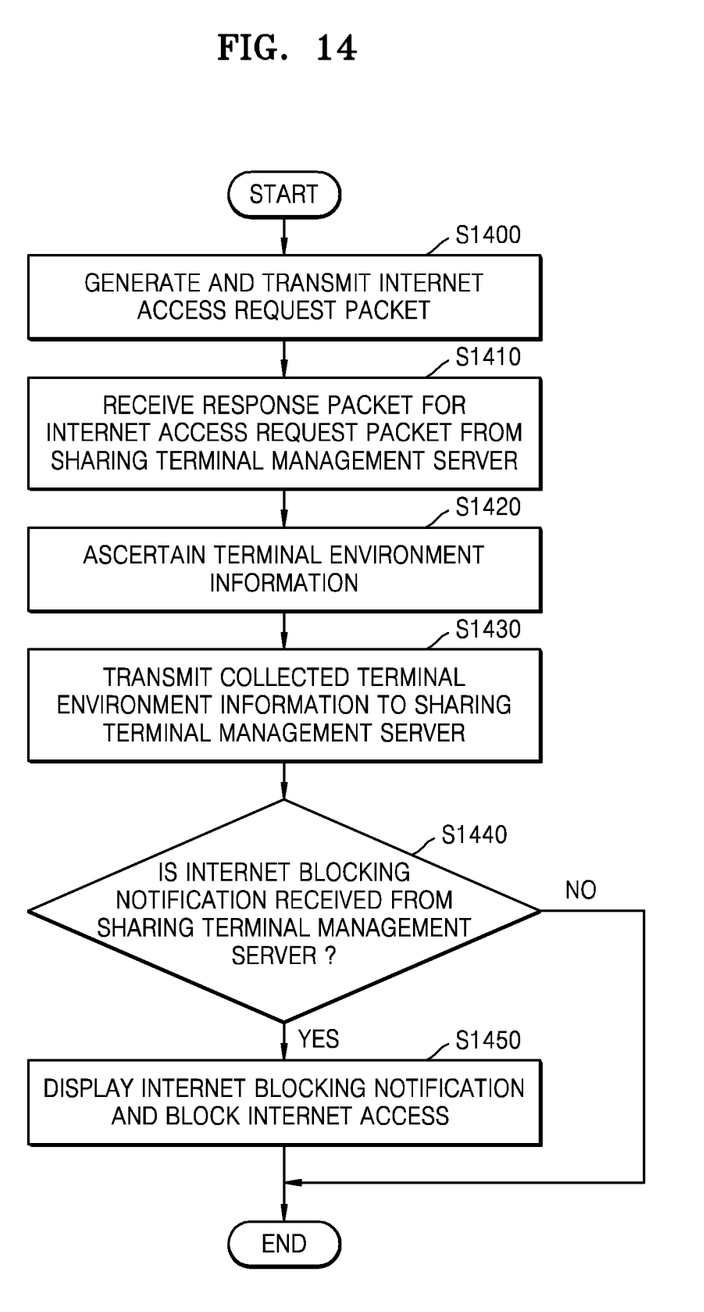
FIG. 14 is a flowchart of a sharing terminal management method in a user terminal, according to an embodiment of the present disclosure.

FIG. 14 is a flowchart of a sharing terminal managing method in a user terminal, according to an embodiment of the present disclosure.

Referring to FIG. 14, in operation S1400, a user terminal that shares an Internet address, namely, a sharing terminal, generates and transmits an Internet access request packet. In operation S1410, when the Internet access request packet coincides with a certain condition, the sharing terminal receives a response packet for the Internet access request packet from a sharing terminal management server. Because a first response packet transmitted by the sharing terminal management server reaches the sharing terminal earlier than a second response packet transmitted by a server to which the sharing terminal originally seeks to connect, the second response packet received after the first response packet is discarded by the sharing terminal.

In operations S1420 and S1430, the sharing terminal collects terminal environment information according to a command included in the response packet and transmits the collected terminal environment information to the sharing terminal management server. For example, when the web server implemented in the sharing terminal management server transmits a response packet including a terminal environment information collecting command in the form of a plug-in installed on a browser of the sharing terminal, the browser of the sharing terminal collects terminal environment information by performing the plug-in and transmits the collected terminal environment information to the web server that transmitted the response packet.

In operation S1440, when the sharing terminal is determined to be a target to which a blocking notification is to be transmitted according to a preset condition, the sharing terminal receives an Internet blocking notification from the sharing terminal management server. In operation S1450, Internet access by the sharing terminal in response to the Internet blocking notification is blocked.

The present disclosure can be embodied as computer readable codes on a computer readable recording medium. The computer readable recording medium is any type of recording device that stores data which can thereafter be read by a computer system. Examples of the computer-readable recording medium include ROM, RAM, CD-ROMs, magnetic tapes, floppy discs, and optical data storage media. The computer readable recording medium can also be distributed over network coupled computer systems so that the computer readable code is stored and executed in a distributive manner.

While the present disclosure has been particularly shown and described with reference to exemplary embodiments thereof, it will be understood by those of ordinary skill in the art that various changes in form and details may be made therein without departing from the spirit and scope of the disclosure as defined by the appended claims. It should be understood that the disclosed embodiments should be considered in a descriptive sense only and not for purposes of limitation. Therefore, the scope of the present disclosure is defined not by the detailed description of the present disclosure but by the appended claims, and all differences within the scope will be construed as being included in the present disclosure.

What is claimed is:

1. A sharing terminal management method in a sharing terminal management server, the sharing terminal management method comprising:
   receiving an Internet access request packet;
   transmitting a response packet for the Internet access request packet, wherein the response packet comprises a syntax that induces access to a preset web server;
   collecting terminal environment information from a terminal that has transmitted the Internet access request packet by using the response packet;
   collecting as many different pieces of terminal environment information as the number of terminals permitted for each line and storing the collected pieces of terminal environment information in a permitted list; and
   determining whether to transmit an Internet blocking notification, based on whether newly collected terminal environment information exists in the permitted list,
   determining whether an obstacle has occurred in the web server; and
   stopping transmission of the Internet blocking notification when it is determined that an obstacle has occurred in the web server.

2. The sharing terminal management method of claim 1, wherein the receiving of the Internet access request packet comprises:
   determining whether a packet belongs to HTTP GET traffic;
   when the packet belongs to the HTTP GET traffic, determining whether a domain that the packet seeks to access belongs to a primary domain;
   when the domain that the packet seeks to access belongs to the primary domain, determining whether a GET or POST parameter exists in the packet; and
   receiving a packet including no GET or POST parameters as the Internet access request packet.

3. The sharing terminal management method of claim 1, wherein the transmitting of the response packet comprises:
   determining whether the terminal of transmitting the Internet access request packet is a sharing terminal that shares a public Internet address; and
   transmitting the response packet that is to be sent to the public Internet address, when the terminal is the sharing terminal.

4. The sharing terminal management method of claim 1, wherein the response packet comprises a terminal environment information collection command in the form of a web browser plug-in including a script language or flash.

5. The sharing terminal management method of claim 1, wherein the collecting of the terminal environment information comprises receiving terminal environment information comprising at least one of a plug-in value of an Internet access browser, operating system (OS) information, a user-agent, screen size information, and system font information.

6. The sharing terminal management method of claim 1, wherein the storing comprises transforming the terminal environment information into a hash code and storing the hash code.

7. The sharing terminal management method of claim 1, wherein the storing comprises:
   ascertaining the number of times pieces of terminal environment information are collected during a preset time period; and
   storing as many different pieces of terminal environment information as the number of terminals permitted for each line in the permitted list, based on the number of times.

8. The sharing terminal management method of claim 1, wherein the determining of whether to transmit the Internet blocking notification comprises: ascertaining whether the newly collected terminal environment information exists in the permitted list;
   ascertaining whether the number of different pieces of terminal environment information stored in the permitted list is equal to the number of permitted terminals; and
   transmitting an Internet blocking notification to the terminal that has transmitted the Internet access request packet, when the newly collected terminal environment information does not exist in the permitted list and the number of different pieces of terminal environment information stored in the permitted list is equal to the number of permitted terminals.

9. The sharing terminal management method of claim 8, wherein the determining of whether to transmit the Internet blocking notification comprises allowing re-access to a site that the Internet access request packet originally sought to access, when the newly collected terminal environment information exists in the permitted list and the number of different pieces of terminal environment information stored in the permitted list is less than the number of permitted terminals.

10. The sharing terminal management method of claim 1, further comprising:
   receiving a permitted terminal change request from a terminal that has received the Internet blocking notification;
   ascertaining whether the permitted terminal change request has already existed in a preset time period; and
   when no permitted terminal change requests exist in the preset time period, changing one of the pieces of terminal environment information stored in the permitted list to newly received terminal environment information.

11. The sharing terminal management method of claim 1, further comprising:
receiving a consultation reservation request from a terminal that has received the Internet blocking notification;
storing, in a consultation center server, consultation reservation information including information about the terminal that has transmitted the consultation reservation request; and
allowing Internet access by the terminal that has received the Internet blocking notification.

12. The sharing terminal management method of claim 1, wherein the determining of whether to transmit the Internet blocking notification comprises determining whether to transmit the Internet blocking notification, by using blocking notification time information preset according to region, time, or subscriber.

13. A non-transitory computer-readable recording medium having recorded thereon a computer program, which, when executed by a computer, performs the sharing terminal management method of claim 1.

14. A sharing terminal management method in a user terminal, the sharing terminal management method comprising:
transmitting an Internet access request packet;
when a response packet for the Internet access request packet is received from a sharing terminal management server rather than from a server that the Internet access request packet originally sought to access, ascertaining terminal environment information and transmitting the terminal environment information to the sharing terminal management server; and
receiving an Internet blocking notification from the sharing terminal management server and displaying the Internet blocking notification on a screen of the user terminal,
wherein the response packet comprises a syntax that induces access to a preset web server;
wherein the sharing terminal management server determines whether an obstacle has occurred in the web server; and stops transmission of the Internet blocking notification when it is determined that an obstacle has occurred in the web server.

15. The sharing terminal management method of claim 14, wherein the displaying comprises, when the terminal environment information does not exist in a permitted list pre-stored in the sharing terminal management server, receiving the Internet blocking notification from the sharing terminal management server.

16. The sharing terminal management method of claim 14, wherein a screen image corresponding to the Internet blocking notification comprises a permitted terminal change button or a consultation reservation button.

17. The sharing terminal management method of claim 14, further comprising, when a consultation reservation button displayed on a screen image of the Internet blocking notification is selected by a user, re-accessing the server that the Internet access request packet originally sought to access.

18. The sharing terminal management method of claim 14, further comprising, when a consultation reservation button displayed on a screen image of the Internet blocking notification is selected by a user, storing consultation reservation information about the user terminal in the consultation center server.

19. The sharing terminal management method of claim 14, wherein the displaying comprises receiving the Internet blocking notification only in a preset time period.

20. The sharing terminal management method of claim 14, wherein the user terminal is a terminal pre-stored as a sharing terminal in the sharing terminal management server.

* * * * *